(12) United States Patent
Chi et al.

(10) Patent No.: US 7,599,406 B2
(45) Date of Patent: Oct. 6, 2009

(54) FIBER RING LASER

(75) Inventors: Sien Chi, Hsinchu (TW); Chien-Hung Yeh, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 81 days.

(21) Appl. No.: 12/025,775

(22) Filed: Feb. 5, 2008

(65) Prior Publication Data

US 2009/0086787 A1    Apr. 2, 2009

(30) Foreign Application Priority Data

Oct. 2, 2007 (TW) .............................. 96136902 A

(51) Int. Cl.
*H01S 3/30* (2006.01)
*H01S 3/083* (2006.01)
*H01S 3/082* (2006.01)

(52) U.S. Cl. ................................ 372/6; 372/94; 372/97

(58) Field of Classification Search ................. 372/6, 372/94, 97
See application file for complete search history.

(56) References Cited

U.S. PATENT DOCUMENTS 6,407,855 B1    6/2002    MacCormack et al.
6,560,247 B2    5/2003    Chang et al.

OTHER PUBLICATIONS

"Dual-Wavelength 10-GHz Actively Mode-Locked Erbium Fiber Laser", IEEE Photonics Technol. Lett., Nov. 1999, vol. 11, p.p. 1387-1389, Bakhshi et al.
"A Dual-Wavelength Sampled Fiber Bragg Grating and its Application in L-band Dual-wavelength Erbium-Doped Fiber Lasers", IEEE Photonics Technology Letters, 18 (17-20): 2114-2116 Sep.-Oct. 2006, Xueming Liu.

*Primary Examiner*—Armando Rodriguez
(74) *Attorney, Agent, or Firm*—Jianq Chyun IP Office

(57) ABSTRACT

A fiber ring laser is provided, which includes an optic amplifier, a first optical coupler (OCP), a second OCP, a first fiber ring, a second fiber ring, a first polarization controller (PC), and a second PC. The first fiber ring is coupled to the optic amplifier, the first and the second OCPs. The second fiber ring is coupled to the first and the second OCPs. The optic amplifier amplifies a first laser beam with a specified wavelength range. The first fiber ring receives the first laser beam. The first and the second fiber rings respectively provide a first and a second resonant cavities. The first and the second PCs respectively control polarization states of the first and second resonant cavities. The first laser beam resonates in the first and the second resonant cavities to generate a second laser beam with a first and a second wavelengths.

16 Claims, 7 Drawing Sheets

FIBER RING LASER

CROSS-REFERENCE TO RELATED APPLICATION

This application claims the priority benefit of Taiwan application serial no. 96136902, filed on Oct. 2, 2007. The entirety of the above-mentioned patent application is hereby incorporated by reference herein and made a part of this specification.

BACKGROUND OF THE INVENTION

1. Field of the Invention

The present invention relates to a fiber ring laser, and more particularly, to a fiber ring laser capable of emitting a laser beam with multiple wavelengths.

2. Description of Related Art

Fiber communication technology provides an extremely wide bandwidth, which facilitates the users to enjoy rapid and convenient network service. However, the fiber communication components are quite expensive due to the complex processes or the materials, so the communication technology is mainly used in the backbone network. Currently, the methods of division multiplexing in the fiber communication technology include time division multiplexing, wavelength division multiplexing, code division multiplexing, etc. For the purpose of achieving the full duplex in the fiber communications technology, the upstream signals and downstream signals are mostly required to have two different wavelengths.

Accordingly, in order to generate a laser beam with a plurality of different wavelengths, many research institutions and manufacturers of fiber communication components have developed a variety of lasers capable of emitting a laser beam with different wavelengths, for the application in optical metro network, optical access network, and optical fiber sensor system.

Referring to U.S. Pat. No. 6,560,247, Chang et al. set forth a laser capable of emitting a dual-wavelength laser beam. However, the dual-wavelength laser needs several short periodic Fiber Bragg Gratings (FBGs) to form two resonant cavities with specified wavelengths and attain a laser beam with two specified wavelengths. The precise FBG requires a fine coating technique, thus raising the cost of the dual-wavelength laser.

Referring to U.S. Pat. No. 6,407,855, MacCormack et al. set forth a laser capable of emitting a multi-wavelength laser beam at a time. The multi-wavelength laser uses cascaded Raman resonators and a plurality of precise FBGs for emitting the multi-wavelength laser beam. However, the multi-wavelength laser needs a Raman resonator, which aggregates the nonlinear effect of the overall laser. Therefore, an expensive high-power pumping laser must be added. The multi-wavelength laser needs a precise FBG and expensive high-power pumping laser, thus leading to a high manufacturing cost of the multi-wavelength laser.

Further, referring to Bamdad Bakhshi, and Peter A. Andrekson, "Dual-Wavelength 10-GHz Actively Mode-Locked Erbium Laser", *IEEE Photonics Technol. Lett.*, November, 1999, vol. 11, p.p. 1387-1389", Bakhshi et al. set forth a dual-wavelength laser that needs two Raman pumping lasers and requires a complex mode-locking circuit, so the cost is till high.

Finally, referring to "Xueming Liu, "A Dual-Wavelength Sampled Fiber Bragg Grating and its Application in L-band Dual-wavelength Erbium-Doped Fiber Lasers", *IEEE PHOTONICS TECHNOLOGY LETTERS*, 18 (17-20): 2114-2116 SEPTEMBER-OCTOBER 2006", Xueming Liu set forth a dual-wavelength laser that needs the FBG as well and adopts the Raman pump. Therefore, the dual-wavelength laser provided by Xueming Liu still has the problem of the cost.

In view of above, the conventional multi-wavelength or dual-wavelength laser needs a passive optical filter (for example, FBG) in the fiber ring, and requires a Raman pumping laser to emit the dual-wavelength and multi-wavelength laser. Therefore, the cost of the conventional multi-wavelength or dual-wavelength laser is high.

SUMMARY OF THE INVENTION

An exemplary example of the present invention provides a fiber ring laser, which is capable of emitting a laser beam with more than two wavelengths.

An exemplary example of the present invention provides a method of generating a laser beam. The laser adopting this method is capable of emitting a laser beam with more than two wavelengths.

Accordingly, an exemplary example consistent with the present invention provides a fiber ring laser, which includes an optic amplifier, a first optical coupler (OCP), a second OCP, a first fiber ring, a second fiber ring, a first polarization controller (PC), and a second PC. The first fiber ring is coupled to the optic amplifier, the first OCP and the second OCP. The second fiber ring is coupled to the first OCP and the second OCP. The first PC is coupled to the first fiber ring. The second PC is coupled to the second fiber ring. The optic amplifier amplifies a first laser beam with a specified wavelength range. The first fiber ring receives the first laser beam and provides a first resonant cavity. The second fiber ring provides a second resonant cavity. The first PC controls a polarization state of the first resonant cavity. The second PC controls a polarization state of the second resonant cavity. The first laser beam resonates in the first resonant cavity and second resonant cavity to generate a second laser beam with a first wavelength and a second wavelength.

In the fiber ring laser according to an exemplary example consistent with the present invention, the first resonant cavity has a first free spectrum range. The second resonant cavity has a second free spectrum range. A first frequency and a second frequency corresponding to the first wavelength and the second wavelength are common multiples of the first free spectrum range and second free spectrum range. The first fiber ring has a first fiber ring filter, and the second fiber ring has a second fiber ring filter.

In the fiber ring laser according to an exemplary example consistent with the present invention, the fiber ring laser further includes a third fiber ring and a third PC. The third fiber ring is coupled to the first OCP and the second OCP. The third PC is coupled to the third fiber ring. The third fiber ring provides a third resonant cavity. The third PC controls a polarization state of the third resonant cavity. The first laser beam resonates in the first resonant cavity, the second resonant cavity, and the third resonant cavity to generate a third laser beam with a first wavelength, a second wavelength, and a third wavelength. The third resonant cavity has a third free spectrum range. A first frequency, a second frequency, and a third frequency corresponding to the first wavelength, the second wavelength, and the third wavelength are common multiples of the first free spectrum range, the second free spectrum range, and the third free spectrum range. The third fiber ring has a third fiber ring filter.

The present invention provides a method of generating a laser beam, which includes the following steps. (a) A first laser beam with a specified wavelength range is amplified. (b)

A first resonant cavity with a first free spectrum and a second resonant cavity with a second free spectrum are provided. The first resonant cavity has a first fiber ring filter and the second resonant cavity has a second fiber ring filter. (c) The polarization state of the first resonant cavity is controlled. (d) The polarization state of the second resonant cavity is controlled. (e) A second laser beam with a first wavelength and a second wavelength is generated. The method of generating the second laser beam includes resonating the first laser beam in the first resonant cavity and second resonant cavity.

In the method of generating a laser beam according to an exemplary example consistent with the present invention, a first frequency and a second frequency corresponding to the first wavelength and the second wavelength are common multiples of the first free spectrum range and the second free spectrum range.

In the method of generating a laser beam according to an exemplary example consistent with the present invention, the method of generating a laser beam further includes the following steps. (f) A third resonant cavity with a third free spectrum range is provided. The third resonant cavity has a third fiber ring filter. (g) The polarization state of the third resonant cavity is controlled. (h) A third laser beam with the first wavelength, the second wavelength, and the third wavelength is generated. The method of generating the third laser beam includes resonating the first laser beam in the first resonant cavity, the second resonant cavity, and third resonant cavity. A first frequency, a second frequency, and a third frequency corresponding to the first wavelength, the second wavelength, and the third wavelength are common multiples of the first free spectrum range, the second free spectrum range, and the third free spectrum range.

The fiber ring laser of an exemplary embodiment of the present invention mainly adopts a fiber ring and a optic amplifier to generate resonant cavities and amplify the resonance signals, so as to generate a laser beam with more than two wavelengths. Based on the above architecture, an exemplary example consistent with the present invention does not need a passive optical filter, thus reducing the manufacturing cost. The fiber ring laser of the present invention does not need a high-power pumping laser, which is different from the conventional multi-wavelength or dual-wavelength laser using the Raman amplifier, so the manufacturing cost can be further reduced.

In order to make the aforementioned and other features and advantages of the present invention comprehensible, multiple embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention provides a fiber ring laser, which is capable of emitting a laser beam with more than two wavelengths without using a passive optical filter in the fiber ring or relying on the nonlinear effect (for example, Raman amplifier).

Figure 1:
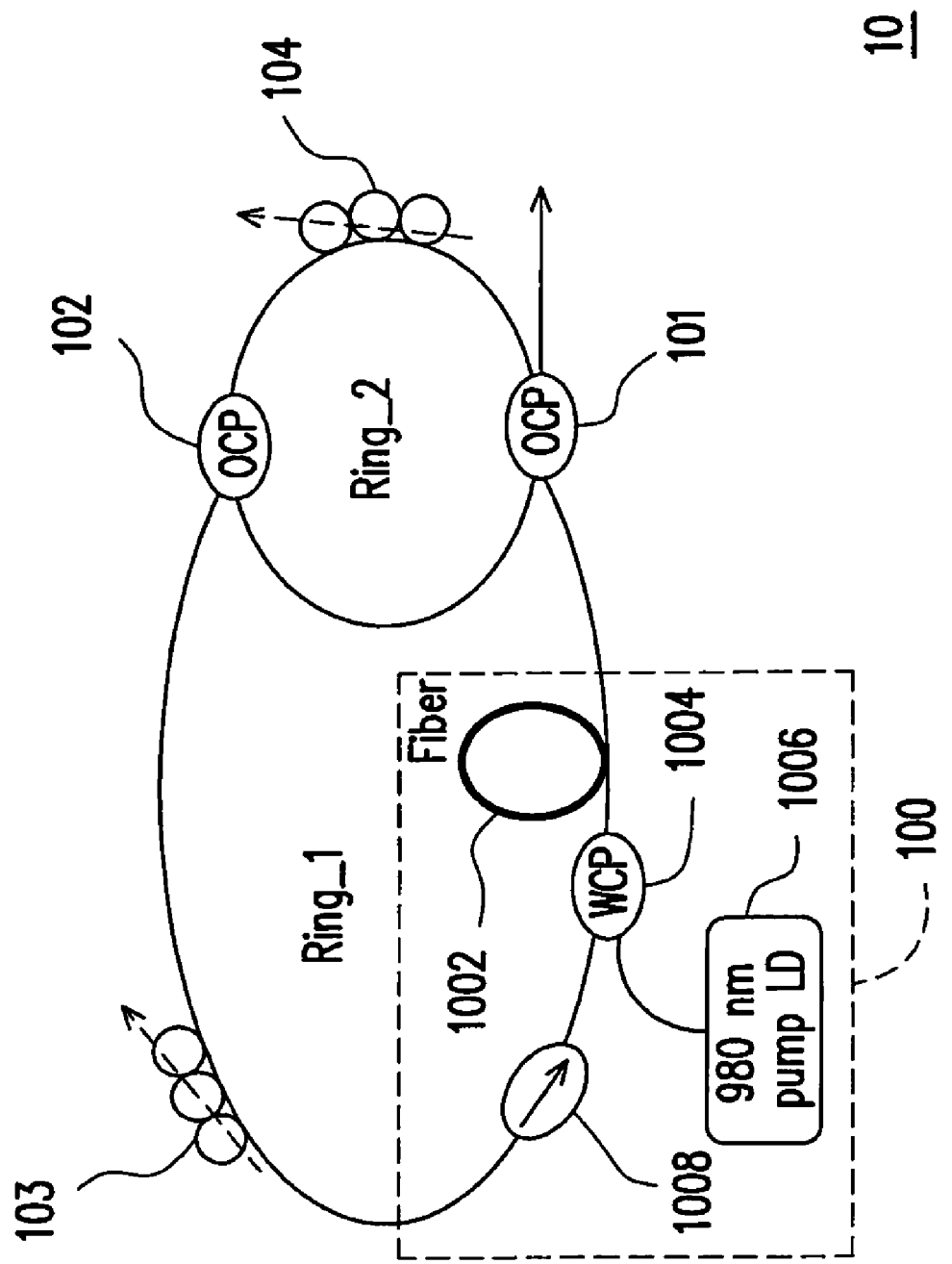
FIG. 1 shows a fiber ring laser according to an exemplary example consistent with the present invention.

The present invention mainly uses an optic amplifier and fiber rings to form resonant cavities, so as to generate a laser beam with more than two wavelengths. Referring to FIG. 1, a fiber ring laser according to an embodiment of the present invention is shown. A fiber ring laser 10 includes an optic amplifier 100, a first OCP 101, a second OCP 102, a first fiber ring Ring_1, a second fiber ring Ring_2, a first PC 103, and a second PC 104. The first fiber ring Ring_1 is coupled to the optic amplifier 100, the first and the second OCP 101, 102. The second fiber ring Ring_2 is coupled to the first and the second OCP 101, 102. The first PC 103 is coupled to the first fiber ring Ring_1. The second PC 104 is coupled to the second fiber ring Ring_2. The optic amplifier 100 amplifies a first laser beam with a specified wavelength range. The first fiber ring Ring_1 receives the first laser beam and provides a first resonant cavity. The second fiber ring Ring_2 provides a second resonant cavity. The first PC 103 controls the polarization state of the first resonant cavity. The second PC 104 controls the polarization state of the second resonant cavity. The first laser beam resonates in the first and second resonant cavities to generate a second laser beam with a first and a second wavelength.

The free spectrum range of the resonant cavity of the fiber ring is FSR=c/nL, where c is the speed of light, n is the refractive index of the fiber ring, and L is the length of the fiber ring. Based on the above formula, as long as the lengths of the first and the second fiber ring Ring_1, Ring_2 are selected, a free spectrum range FSR_1 of the first resonant cavity and a free spectrum range FSR_2 of the second resonant cavity may be calculated. When the first laser beam resonates in the first resonant cavity and second resonant cavity, a second laser beam with a first wavelength and a second wavelength will be generated. The first wavelength and the second wavelength meet the following conditions that a first frequency and a second frequency corresponding to the first and the second wavelength are common multiples of the free spectrum range FSR_1 and the free spectrum range FSR_2.

Figure 2:
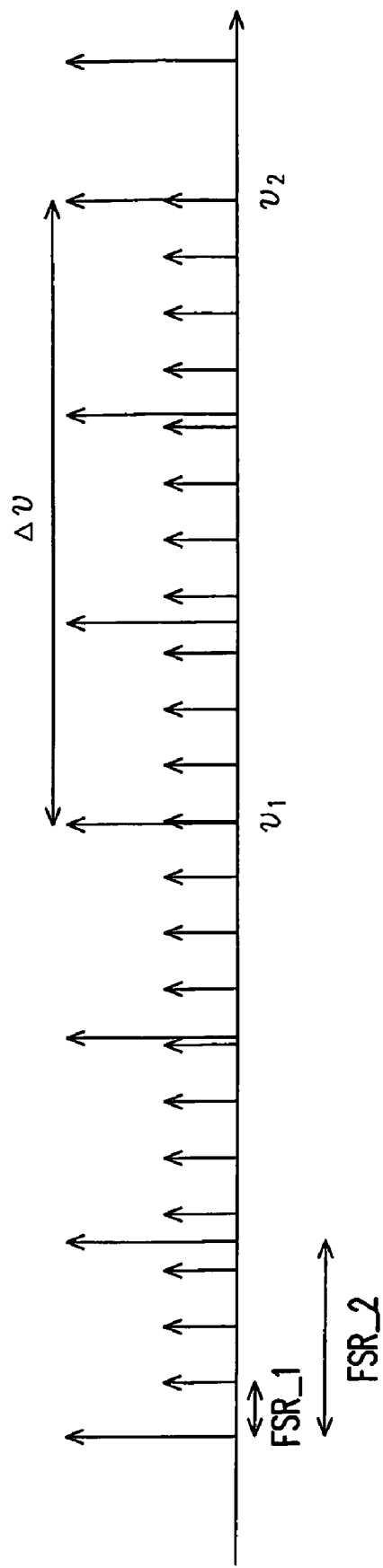
FIG. 2 is a schematic view of a spectrum of a signal.

Referring to FIG. 1 again, provided that the length of the first fiber ring Ring_1 is assumed to be 22 m, the length of the second fiber ring Ring_2 is assumed to be 6 m, and the refractive indices of the first and the second fiber ring Ring_1, Ring_2 are 1.468, the free spectrum range FSR_1 of the first resonant cavity is equal to 9.3 MHz, and the free spectrum range FSR_2 of the second resonant cavity is equal to 34.1 MHz. FIG. 2 is a schematic view of a spectrum of a signal. Referring to FIG. 2, the difference between the first frequency $v_1$ and the second frequency $v_2$ corresponding to the first and the second wavelength is the least common multiple of the free spectrum range FSR_1 and the free spectrum range_2. As shown in FIG. 2, the difference $\Delta v$ between the first frequency $v_1$ corresponding to the first wavelength and the second frequency $v_2$ corresponding to the second wavelength is equal to 102.3 MHz (i.e. 102.3 MHz=34.1*3 MHz=9.3*11 MHz). Then, only by using the first fiber ring filter of the first fiber ring Ring_1 and the second fiber ring filter of the second fiber ring Ring_2, a second laser beam with a first wavelength and a second wavelength may be obtained from the OCP 101.

Referring to FIG. 1 again, the optic amplifier 100 may be Erbium-Doped Fiber Amplifier (EDFA), but the optic amplifier implemented by the EDFA is not intended to limit the scope the present invention. The optic amplifier 100 includes a fiber 1002, a wavelength division multiplex coupler (WCP) 1004, a pumping laser 1006, and an optical isolator (OIS) 1008. The wavelength division multiplex coupler 1004 is coupled to the fiber 1002. The pumping laser 1006 is coupled to the wavelength division multiplex coupler 1004. The optical isolator 1008 is coupled to the wavelength division multiplex coupler 1004. With the function of the optical isolator 1008, the first and second laser beams will be transferred in a counter-clockwise direction in this embodiment. Wherein, the fiber 1002 may be an erbium-doped fiber.

The pumping laser 1006 may be a pumping laser for emitting a laser beam of 980 nm or 1480 nm. In this embodiment, only the laser beam of 980 nm is described as an example, but the laser beam emitted by the pumping laser 1006 is not intended to limit the present invention. The wavelength range that the fiber ring laser 100 can amplify is from 1520 nm to 1620 nm or from 514 nm to 1480 nm. Therefore, in this embodiment, the specified wavelength range is from 1520 nm to 1620 nm.

Figure 3:
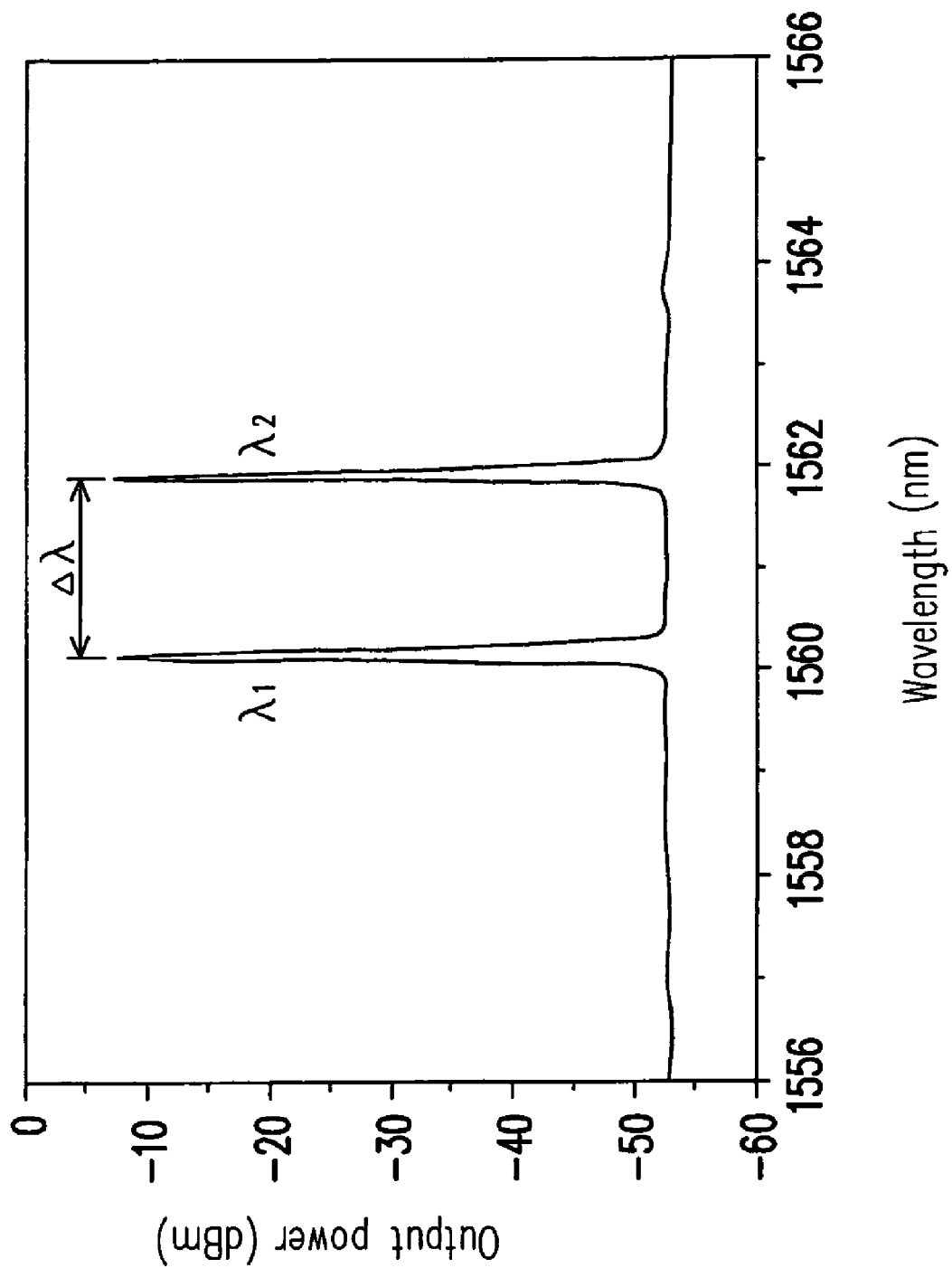
FIG. 3 is a schematic view of a wavelength and an output power of a second laser beam generated by the fiber ring laser 100 in FIG. 1.

Next, referring to FIG. 3, a schematic view of a wavelength and an output power of a second laser beam generated by a fiber ring laser 100 in FIG. 1. In this embodiment, provided that the power of the pumping laser 1006 is 110 mW, the length of the first fiber ring Ring_1 is 22 m, the length of the second fiber ring Ring_2 is 6 m, and the refractive indices of the first and second fiber rings Ring_1, Ring_2 are 1.468, the free spectrum range FSR_1 of the first resonant cavity is 9.3 MHz, the free spectrum range FSR_2 of the second resonant cavity is 34.1 MHz. As shown in FIG. 3, only by using the first fiber ring filter of the first fiber ring Ring_1 and the second fiber ring filter of the second fiber ring Ring_2, a laser beam with a first wavelength and a second wavelength may be obtained from the OCP 101. The first wavelength $\lambda_1$, is 1560.17 nm, and the second wavelength $\lambda_2$ is 1561.93 nm. The output mode pitch $\Delta \lambda$ of the first wavelength $\lambda_1$ and the second wavelength $\lambda_2$ is equal to 1.76 nm, and the side-mode suppression ratio (SMSR) of the first wavelength $\lambda_1$ and the second wavelength $\lambda_2$ will be greater than 45.3 dB. However, the values of the lengths of the first wavelength $\lambda_1$ and the second wavelength $\lambda_2$, the lengths of the Ring_1 and Ring_2, the refractive index, the length of the wavelength of the pumping laser beam, and the free spectrum of the first and the second resonant cavity are only described as an embodiment of the present invention and are not intended to limit the present invention. Those in conformity with the spirit of the present invention fall within the claimed scope of the present invention. In other words, the designer may adjust the lengths of Ring_1 and Ring_2, the refractive indices, the length of the wavelength of the pumping laser beam to generate different free spectrum of the first and the second resonant cavity, so as to generate different lengths of the first wavelength $\lambda_1$ and the second wavelength $\lambda_2$.

Figure 4:
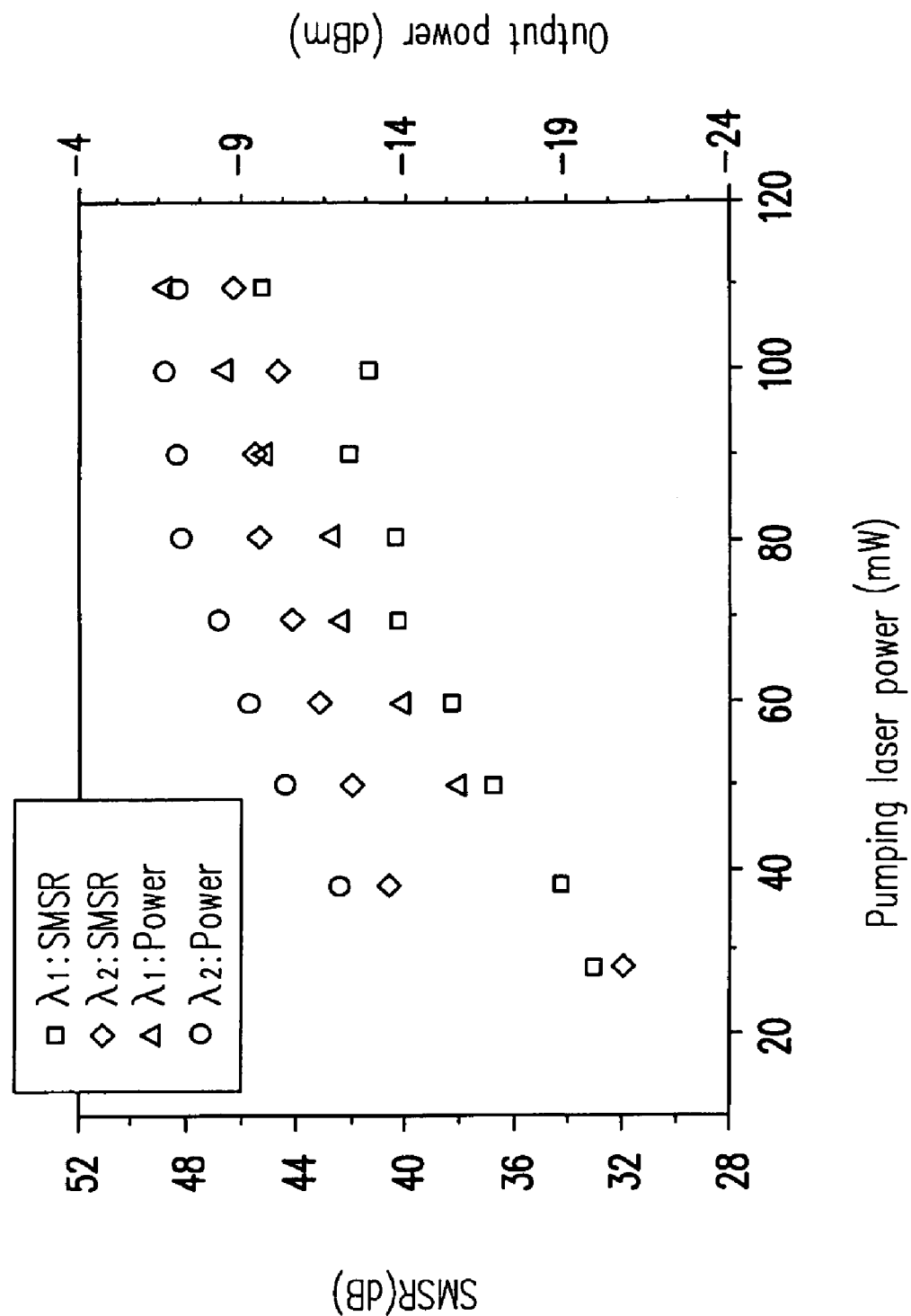
FIG. 4 is a schematic view of an output power and SMSR corresponding to the first wavelength $\lambda_1$ and the second wavelength $\lambda_2$ when the fiber ring laser 100 operates under different pumping laser powers (from 28 to 110 mW).

FIG. 4 is a schematic view of an output power and SMSR corresponding to the first wavelength $\lambda_1$ and the second wavelength $\lambda_2$ when the fiber ring laser 100 operates under different pumping laser powers (from 28 to 110 mW). When the power of the pumping laser is lower than 28 mW, the output power of the first wavelength $\lambda_1$ and second wavelength $\lambda_2$ is under −24 dBm. When the power of the 980 nm pumping laser is from 28 mW to 110 mW, the output power of the first wavelength $\lambda_1$ and the SMSR are distributed between −19.5 dBm and −8.1 dBm and between 33 dB and 45 dB respectively, and the output power of the second wavelength $\lambda_1$ and the SMSR are distributed between −27.8 dBm and −7.1 dBm and between 32 dB and 42 dB respectively. The variances of the maximum output power and the minimum output power are 8.3 dB and 1 dB respectively when the power of the pumping laser is 28 mW and 110 mW.

Figure 5:
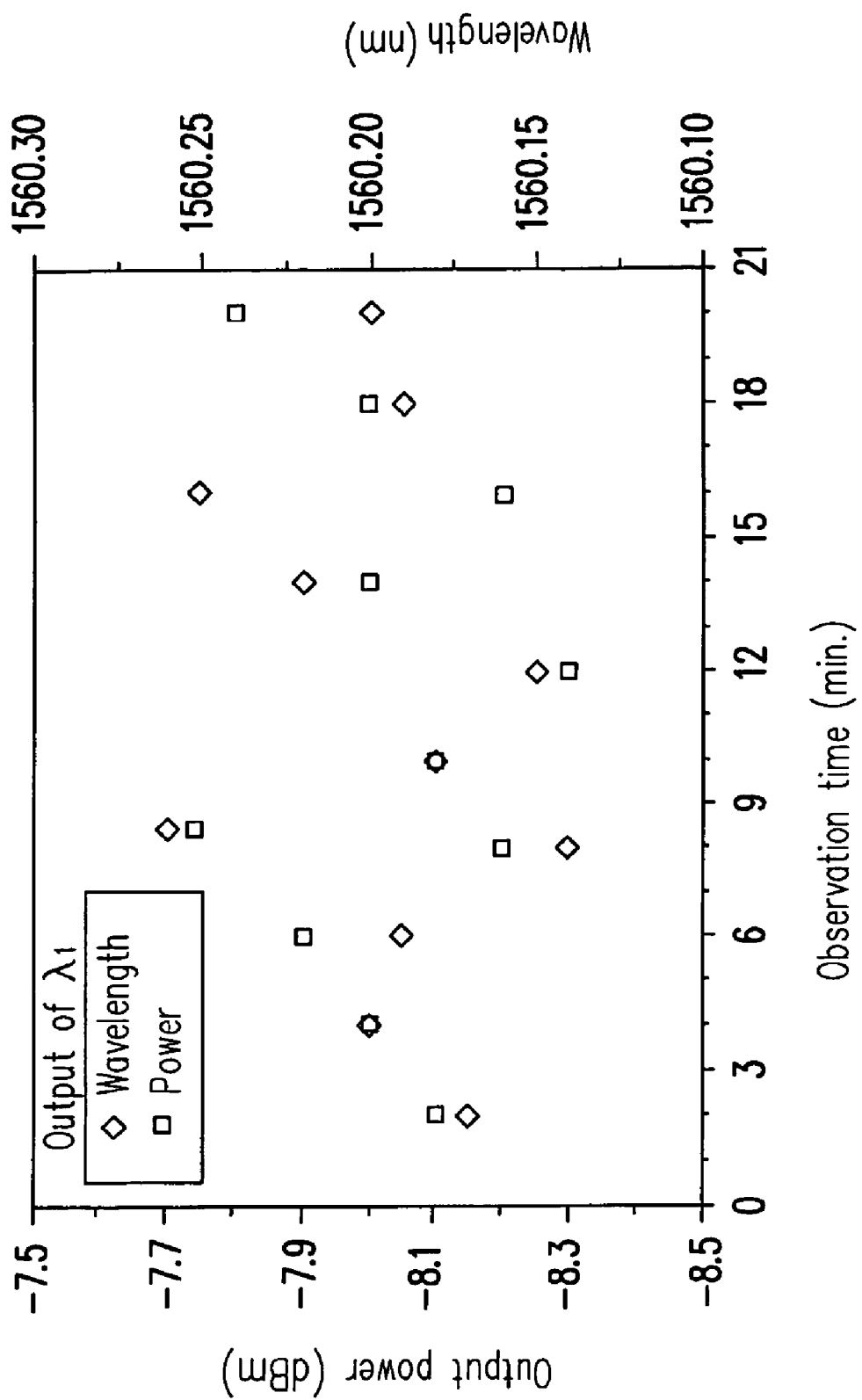
FIG. 5 shows variances of an output power and a wavelength of the first wavelength $\lambda_1$ in an observation time period of 20 mins.

FIG. 5 shows the variances of the output power and the wavelength of the first wavelength $\lambda_1$ in an observation time period of 20 mins. As shown in FIG. 5, the variance of the first wavelength $\lambda_1$ and variance of the output power are less than 0.11 nm and 0.5 dB respectively in an observation time period of 20 mins.

According to FIGS. 3-5, the fiber ring laser 100 of the present invention can emit a dual-wavelength laser beam, and the output dual wavelength is extremely stable (i.e. that variance of the wavelength is very small), and the variance of the output power is also very small, and the SMSR is at least greater than 30 dB.

Figure 6:
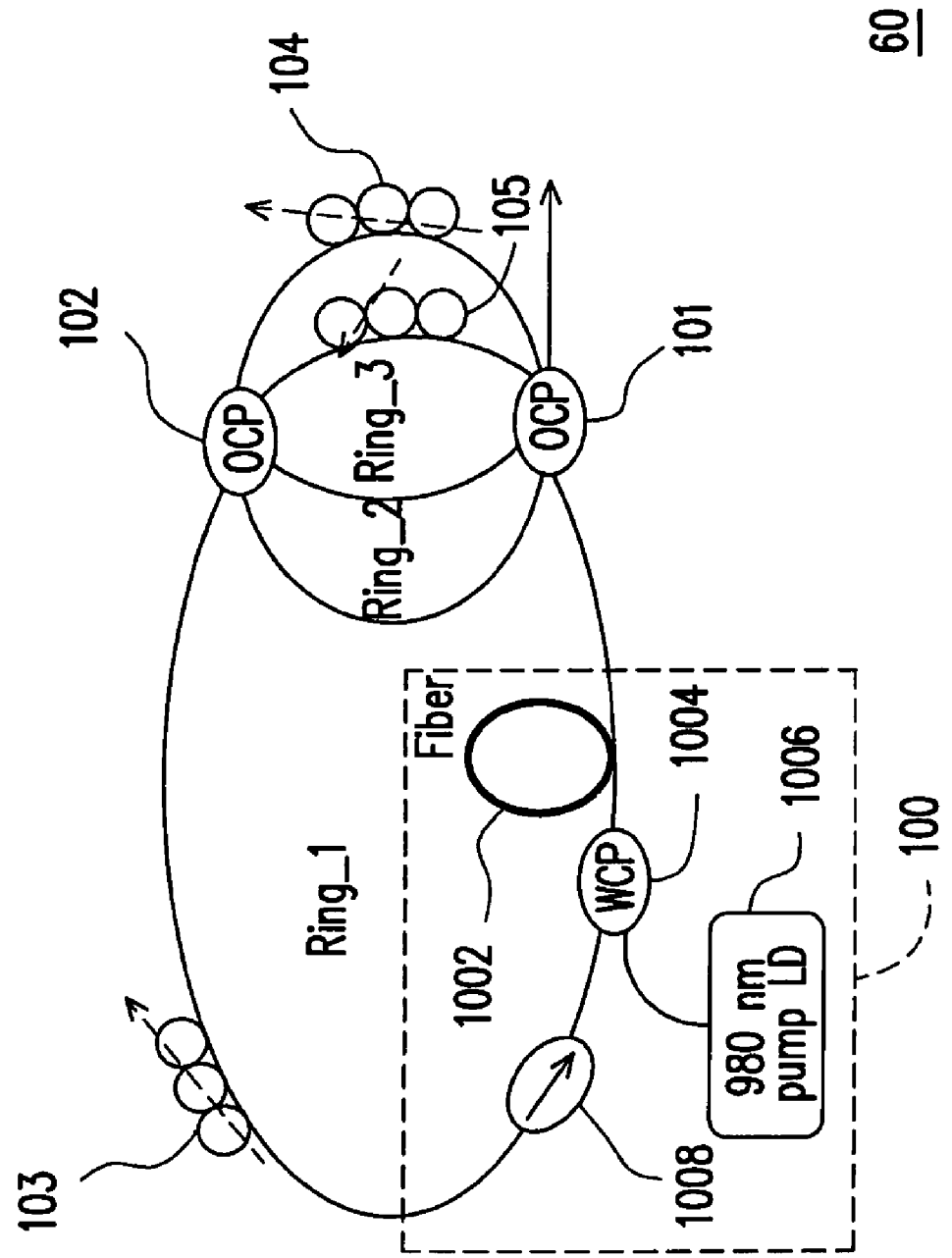
FIG. 6 shows a fiber ring laser according to another embodiment.

FIG. 6 shows an fiber ring laser according to another embodiment. An fiber ring laser 60 is similar to the fiber ring laser 10 in FIG. 1, and the difference lies in that a third fiber ring Ring_3 and third PC 105 are added. The third fiber ring Ring_3 is coupled to the first and the second OCP 101, 102, and the third PC 105 is coupled to the third fiber ring Ring_3. The third fiber ring Ring_3 provides a third resonant cavity, and the third PC 105 controls the polarization state of the third resonant cavity. The first laser beam resonates in the first resonant cavity, second resonant cavity, and third resonant cavity to generate a third laser beam with a first wavelength, a second wavelength, and a third wavelength.

As described above, the free spectrum range FSR_1, the free spectrum range FSR_2, and the free spectrum range FSR_3 of the first resonant cavity, the second resonant cavity, and the third resonant cavity can be calculated. A first frequency, a second frequency, and a third frequency corresponding to the first wavelength, the second wavelength, and the third wavelength are common multiples of the free spectrum ranges FSR_1, FSR_2, FSR_3. Next, only by using the first fiber ring filter of the first fiber ring Ring_1, the second fiber ring filter of the second fiber ring Ring_2, and the third fiber ring filter of the third fiber ring Ring_3, a third laser beam with a first wavelength, a second wavelength, and a third wavelength may be obtained from the OCP 101.

Figure 7:
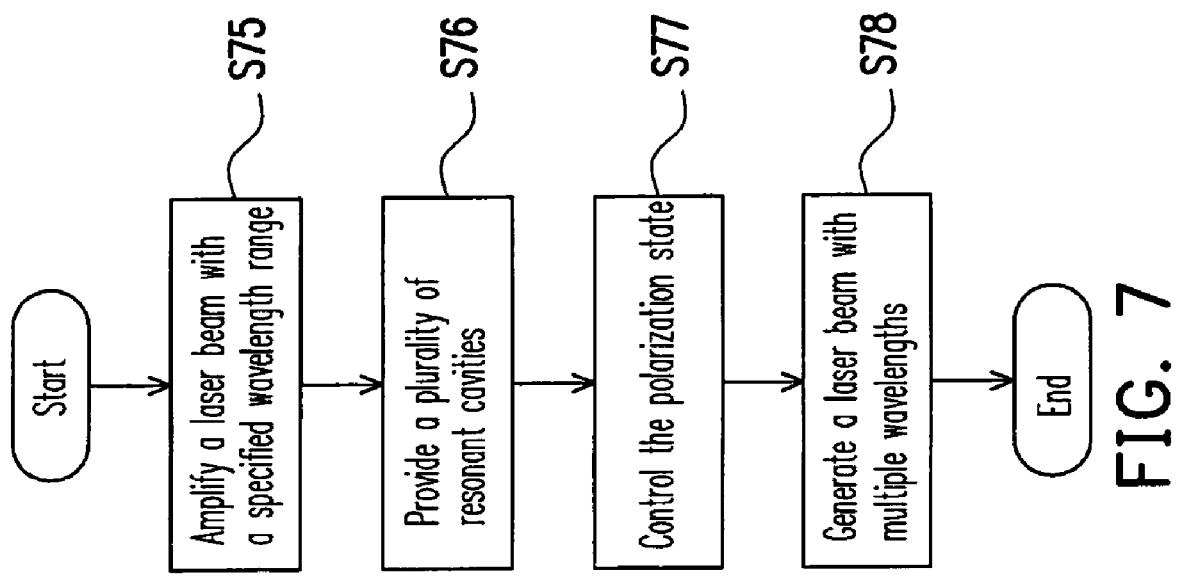
FIG. 7 is a flow chart of a method of generating a laser beam with multiple wavelengths according to the exemplary examples consistent with of the present invention.

FIG. 7 is a flow chart of a method of generating a laser beam with multiple wavelengths according to the embodiments of the present invention. The method includes the following steps. (S75) A laser beam with a specified wavelength range is amplified. (S76) A plurality of resonant cavities is provided. (S77) The polarization states of the resonant cavities are controlled. (S78) A laser beam with multiple wavelengths is generated.

According to the fiber ring laser 10 of FIG. 1, in step (S75), a first laser beam with a specified wavelength range is amplified by using an optic amplifier. In step (S76), the first resonant cavity with a first free spectrum and a second resonant cavity with a second free spectrum are provided by a first fiber ring and a second fiber ring respectively. The first resonant cavity and the second resonant cavity formed by the first fiber ring and the second fiber ring have the first fiber ring filter and the second fiber ring filter. In step (S77), the polarization states of the first resonant cavity and the second resonant cavity are controlled by a first and a second PC. In step (S78), the first laser beam resonates in the first resonant cavity and the second resonant cavity to generate a second laser beam with a first wavelength and a second wavelength. In addition, as described above, a first frequency and a second frequency corresponding to the first wavelength and the second wavelength must be common multiples of the first free spectrum range and the second free spectrum range.

According to the fiber ring laser 60 of FIG. 6, in step (S75), a first laser beam with a specified wavelength range is amplified by an optic amplifier, such as an EDFA. In step (S76), a first resonant cavity with a first free spectrum, a second resonant cavity with a second free spectrum, and a third resonant cavity with a third free spectrum are respectively provided by a first fiber ring, a second fiber ring, and a third fiber ring. The first resonant cavity, the second resonant cavity, and the third resonant cavity formed by the first fiber ring, the second fiber ring, and the third fiber ring have the first fiber ring filter, the second fiber ring filter, and the third fiber ring filter respectively. In step (S77), the polarization states of the first resonant cavity, the second resonant cavity, and the third resonant cavity are controlled by a first PC, a second PC, and a third PC. In step (S78), the first laser beam resonates in the first resonant cavity, second resonant cavity and third resonant cavity to generate a third laser beam with a first wavelength, a second wavelength, and a third wavelength. Furthermore, as described above, a first frequency, a second frequency, and a third frequency corresponding to the first wavelength, the second wavelength, and the third wavelength must be common multiples of the first, the second, and the third free spectrum range.

In view of above, the fiber ring laser of the present invention mainly adopts a fiber ring and an optic amplifier to generate resonant cavities and amplify resonance signals, so as to generate a laser beam with more than two wavelengths. Based on the above architecture, the fiber ring laser provided by the embodiment of the present invention does not need the passive optical filter, thus reducing the manufacturing cost. The fiber ring laser provided by the embodiment of the present invention does not need a high-power pumping laser, which is different from the conventional multi-wavelength or dual-wavelength laser using the Raman amplifier, so the manufacturing cost can be further reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fiber ring laser, comprising:
   an optic amplifier, for amplifying a first laser beam with a specified wavelength range;
   a first optical coupler (OCP);
   a second OCP;
   a first fiber ring, coupled to the optic amplifier, the first OCP and the second OCP, for receiving the first laser beam and providing a first resonant cavity;
   a second fiber ring, coupled to the first OCP and the second OCP, for providing a second resonant cavity;
   a first polarization controller (PC), coupled to the first fiber ring, for controlling a polarization state of the first resonant cavity;
   a second PC, coupled to the second fiber ring, for controlling a polarization state of the second resonant cavity;
   wherein the first laser beam resonates in the first resonant cavity and second resonant cavity to generate a second laser beam with a first wavelength and a second wavelength.

2. The fiber ring laser as claimed in claim 1, wherein the first resonant cavity has a first free spectrum range (FSR), the second resonant cavity has a second free spectrum range, a first frequency and a second frequency corresponding to the first wavelength and the second wavelength are common multiples of the first free spectrum range and the second free spectrum range.

3. The fiber ring laser as claimed in claim 2, wherein the difference between the first frequency and the second frequency is the least common multiple of the first free spectrum range and the second free spectrum range.

4. The fiber ring laser as claimed in claim 2, wherein the first fiber ring has a first fiber ring filter, and the second fiber ring has a second fiber ring filter.

5. The fiber ring laser as claimed in claim 4, wherein the optic amplifier comprises:
   a fiber;
   a wavelength division multiplex coupler, coupled to the fiber;
   a pumping laser, coupled to the wavelength division multiplex coupler; and
   an optical isolator, coupled to the wavelength division multiplex coupler.

6. The fiber ring laser as claimed in claim 5, wherein the first laser beam and the second laser beam are transferred in a specified direction.

7. The fiber ring laser as claimed in claim 1, further comprising:
   a third fiber ring, coupled to the first OCP and the second OCP, for providing a third resonant cavity;
   a third PC, coupled to the third fiber ring, for controlling the polarization state of the third resonant cavity;
   wherein the first laser beam resonates in the first resonant cavity, the second resonant cavity, and the third resonant cavity to generate a third laser beam with the first wavelength, the second wavelength, and a third wavelength.

8. The fiber ring laser as claimed in claim 7, wherein the first resonant cavity has a first free spectrum range, the second resonant cavity has a second free spectrum range, the third resonant cavity has a third free spectrum range, a first frequency, a second frequency, and a third frequency corresponding to the first wavelength, the second wavelength, and the third wavelength are common multiples of the first free spectrum range, the second free spectrum range, and the third free spectrum range.

9. The fiber ring laser as claimed in claim 8, wherein the first fiber ring has a first fiber ring filter, the second fiber ring has a second fiber ring filter, and the third fiber ring has a third fiber ring filter.

10. A method of generating laser beams, comprising:
    amplifying a first laser beam with a specified wavelength range;
    providing a first resonant cavity with a first free spectrum and a second resonant cavity with a second free spectrum, wherein the first resonant cavity has a first fiber ring filter and the second resonant cavity has a second fiber ring filter;
    controlling a polarization state of the first resonant cavity;

controlling a polarization state of the second resonant cavity; and generating a second laser beam with a first wavelength and a second wavelength, wherein a method of generating the second laser beam comprises resonating the first laser beam in the first resonant cavity and the second resonant cavity.

11. The method of generating laser beams as claimed in claim 10, wherein a first frequency and a second frequency corresponding to the first wavelength and the second wavelength are common multiples of the first free spectrum range and the second free spectrum range.

12. The method of generating laser beams as claimed in claim 11, wherein the difference between the first frequency and the second frequency is a least common multiple of the first free spectrum range and the second free spectrum range.

13. The method of generating laser beams as claimed in claim 10, further comprising:

providing a third resonant cavity with a third free spectrum range and having a third fiber ring filter;

controlling the polarization state of the third resonant cavity;

generating a third laser beam with the first wavelength, the second wavelength, and a third wavelength, wherein the method of generating the third laser beam comprises resonating the first laser beam in the first resonant cavity, the second resonant cavity, and the third resonant cavity.

14. The method of generating laser beams as claimed in claim 13, wherein a first frequency, a second frequency, and a third frequency corresponding to the first wavelength, the second wavelength, and the third wavelength are common multiples of the first free spectrum range, the second free spectrum range, and the third free spectrum range.

15. The method of generating laser beams as claimed in claim 10, wherein the first laser beam with the specified wavelength range is amplified by an optic amplifier.

16. The method of generating laser beams as claimed in claim 13, wherein the first resonant cavity, the second resonant cavity, and the third resonant cavity are provided by a first fiber ring, a second fiber ring, and a third fiber ring respectively.

* * * * *